United States Patent [19]

Quigley

[11] 4,442,432
[45] Apr. 10, 1984

[54] ELECTRONIC NAVIGATION METHOD AND SYSTEM

[76] Inventor: William L. Quigley, 3280 E. Fairpoint St., Pasadena, Calif. 91107

[21] Appl. No.: 302,966

[22] Filed: Sep. 17, 1981

Related U.S. Application Data

[63] Continuation of Ser. No. 96,629, Nov. 23, 1979.

[51] Int. Cl.³ .......................... G01S 1/30; G01S 3/02
[52] U.S. Cl. .................................... 343/394; 343/395; 343/451; 343/450
[58] Field of Search ........... 343/112 R, 112 C, 105 R, 343/105 H, 106 D, 113 DE

[56] References Cited

U.S. PATENT DOCUMENTS

| | | | |
|---|---|---|---|
| 1,998,834 | 4/1935 | Englund | 343/113 DE |
| 2,218,907 | 10/1940 | Donnelly et al. | 250/11 |
| 2,413,694 | 1/1947 | Dingley, Jr. | 250/11 |
| 2,472,158 | 6/1949 | Henry | 343/112 |
| 2,682,049 | 6/1954 | Rich | 343/104 |
| 3,206,751 | 9/1965 | Knight | 343/105 |
| 3,242,492 | 3/1966 | Honore et al. | 343/105 |
| 3,535,789 | 10/1970 | Roberts | 343/105 R |
| 3,995,273 | 11/1976 | Ulstad | 343/112 |

*Primary Examiner*—S. C. Buczinski
*Attorney, Agent, or Firm*—Lyon & Lyon

[57] ABSTRACT

A method and system for navigation is disclosed comprising a plurality of transmitters, pairs of which are excited from a common frequency source, and a receiver responsive to and deployed within the wave fields created by the transmitters. The receiver is provided with its initial coordinate position and determines movement therefrom by detecting beat frequency cycles resulting from the relative movement between the receiver and the transmitters of a transmitter pair. The receiver position change is computed according to the beat frequency cycles detected. In a preferred embodiment, transmitter pairs are arranged generally perpendicularly to establish a coordinate system and transmitters of a transmitter pair radiate different frequencies that are precisely related to a common excitation frequency source. The receiver detects the transmitted signals, compensates for the precise frequency relationship employed at each transmitter pair, and compares the signals from each transmitter pair to detect beat frequency cycles which are used to compute receiver position change.

28 Claims, 9 Drawing Figures

ELECTRONIC NAVIGATION METHOD AND SYSTEM

This is a continuation of application Ser. No. 96,629, filed Nov. 23, 1979.

BACKGROUND

This invention relates generally to navigation systems and more particularly to a method and apparatus for measuring movement by detecting and counting beat frequency cycles.

Various navigation systems are well known in the art that use at least two transmitters which are separated by a predetermined distance. Both transmitters generally emit radio frequency signals that are precisely related with respect to time, phase, or frequency. A remotely located receiver, most often aboard a vehicle or vessel that requires position information relative to the transmitters, detects the signals from the transmitters after propagation delays that are proportional to the distances between the receiver and the transmitters. When the detected signals from the transmitters are compared at the receiver, a time, phase or frequency difference will be apparent that is a result of the difference between the particular propagation delays associated with the transmitters. Each propagation delay difference will form a locus of points that fall on one curve of a hyperbola with the two transmitters at the foci thereof. Such navigation systems are generally referred to as hyperbolic systems and various examples thereof are illustrated by the following U.S. Patents: Donnelley, et al U.S. Pat. No. 2,218,907; Dingley U.S. Pat. No. 2,413,694; Henry U.S. Pat. No. 2,472,158; Rich U.S. Pat. No. 2,682,049; Knight U.S. Pat. No. 3,206,751 and Honore et al U.S. Pat. No. 3,242,492.

Another known hyperbolic navigational system comprises a plurality of receivers that are positioned to receive a signal transmitted by a transmitter aboard a vehicle. The number of cycles received by each receiver from the transmitter are counted and the resulting counts are used to determine the movement of the vehicle with respect to the receivers. Such a system is disclosed by the Ulstad U.S. Pat. No. 3,995,273.

Also well known are radar systems that make use of the Doppler effect frequency shift to detect the radial velocity of a moving target with respect to a stationary radar set or to discriminate between fixed and moving targets. In either case, the frequency of the return echo from the target will be shifted according to the radial velocity of the target. This Doppler frequency shift is generally detected by combining the transmitted frequency with the return echo frequency to produce a beat frequency that is proportional to the target radial velocity. Additionally, each cycle of the resulting Doppler beat frequency will correspond to a target radial movement of one-half the wavelength of the transmitted frequency.

The above described hyperbolic navigation systems, however, require signals that must be precisely related through means that may require difficult or expensive adjustment and maintenance. Since the systems rely upon propagation delay to establish the position of the receiver, any alteration in the propagation delay caused by, for example, diurnal atmospheric changes, must be accurately anticipated and corrections must then be made when computing the resulting hyperbolic curve. With respect particularly to the Ulstad patent, the system disclosed therein does not provide navigational information aboard the vehicle and the system is apparently best suited to applications involving only one vehicle since an additional transmitter aboard an additional vehicle would require at least another set of receivers and counters. Finally, while Doppler radar systems may be used for navigational purposes, the equipment is complex and expensive; also various sources of error occur within a typical system, including, for example, compass error associated with the measurement of ground speed and drift angle, and errors introduced due to the low-level return signal received when an aircraft is operated over still water.

SUMMARY OF THE INVENTION

The present invention overcomes these limitations and is directed to an improved and novel hyperbolic navigation method and system. In an exemplary embodiment, two transmitters are separated by a known distance and are both provided with a common excitation frequency signal. The first transmitter emits continuous radio frequency waves at the frequency of the excitation signal. The second transmitter of the pair translates the excitation signal frequency through an exact predetermined frequency shift, thereby resulting in continuous waves emitted from both transmitters whose frequencies are precisely related. A receiver located in the field of radiation emitted by both transmitters detects the signals from each transmitter and translates the signal received from the first transmitter through a precise frequency shift. This second translation is precisely mathematically identical to the frequency translation that occurred at the second transmitter prior to transmission.

The receiver then compares the frequency of the translated signal received from the first transmitter with the frequency of the signal received from the second transmitter by combining the signals to produce a beat frequency. When the receiver is at rest with respect to the transmitter pair, these signals produce no beat frequency at the receiver. However, as the receiver moves with respect to the transmitter pair, beat frequency cycles develop between the transmitted signals as the result of the change in distance between the receiver and the transmitter pair.

A second pair of transmitters located on a line generally perpendicular to the line between the first pair of transmitters similarly emits precisely related frequencies which the receiver detects and processes in a similar fashion, providing a complete two-dimensional coordinate system through which the receiver moves. By detecting and counting beat frequency cycles for each transmitter pair, the movement of the receiver is thereby continuously monitored and can be used to compute and update the position of the receiver.

It is to be understood that the present invention relies on each transmitter being supplied with a common excitation frequency source. The transmitted frequencies appear shifted at the receiver due to the movement of the receiver with respect to the transmitters. This frequency shift results in beat frequency cycles which are used to calculate the magnitude of this relative movement. Thus the present invention provides a new and improved hyperbolic navigation technique that requires in a preferred embodiment only a single excitation frequency source for each pair of transmitters and a means for translating or synthesizing that frequency at the second transmitter of the pair to achieve a second transmitted frequency, techniques which are inexpensive to implement and require little or no calibration or adjustment. The applicant believes that the accuracy of the system may be one-half wavelength of the translated signal described above. Additionally, since the present invention relies upon the detection of beat frequency cycles rather than the direct comparison of propagation delays to determine position, alterations in system propagation delay as would be experienced with diurnal atmospheric changes will not substantially adversely affect the accuracy of the system.

These and other objects and advantages of the present invention will be more fully understood from the following description and the accompanying drawings.

Figure 1:
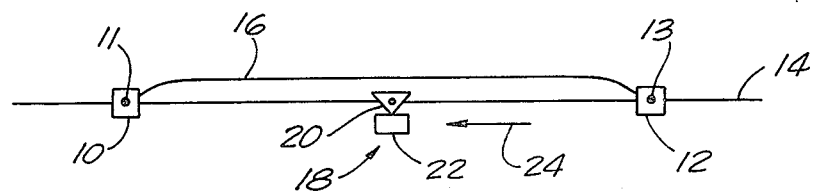
FIG. 1 is a first simplified diagram for illustrating the principle of the present invention.

Referring now in detail to the drawings and in particular to FIG. 1, a simplified example of the principle of the present invention will be explained to aid in the complete understanding thereof.

A first transmitter 10 and a second transmitter 12 each having an antenna 11 and 13 respectively are located along a line 14 that is drawn through the center of both the antennas 11 and 13. A common frequency standard link 16 is disposed so as to connect the transmitters 10 and 12 to provide a means for conducting a common excitation signal from one transmitter to another. For the purposes of this description, it may be assumed that the common excitation signal is produced by the first transmitter 10 and is conducted by the link 16 to the second transmitter 12. This common excitation signal is used to excite both of the transmitters 10 and 12 which, in one embodiment, then radiate two signals with frequencies that are identical. Alternatively and as will be described in greater detail hereinafter, one of the transmitters may be caused to radiate a frequency shifted by a predetermined amount relative to the excitation signal.

Located on the line 14 is a receiver 18 which includes an antenna 20 positioned directly on the line 14 and appropriate signal processing means 22 for detecting the frequencies received from the transmitters 10 and 12. The signal processing means 22 also compares detected frequencies so that a beat frequency may be determined and the cycles of the beat frequency can be counted.

It is well known that as the receiver 18 moves along the line 14 with respect to the first and second transmitters 10 and 12, the velocity of the receiver 18 will cause the receiver to detect an apparent frequency shift in the signals received from the transmitters 10 and 12. For example, if the receiver 18 moves along the line 14 toward the first transmitter 10 in a direction indicated by the arrow 24, then the apparent frequency of the signal from the first transmitter 10 will be higher than the apparent frequency of the signal from transmitter 10 when the receiver 18 is at rest. Similarly, as the receiver 18 moves along the line 14 in the direction of the arrow 24 and away from the second transmitter 12, the apparent frequency of the signal from the second transmitter 12 will be lower than when the receiver 18 is at rest with respect to the second transmitter 12. This change in apparent frequency is known as the Doppler effect.

By way of further example with reference to FIG. 1 in a system where the transmitters are at rest with respect to the propagation medium, if the receiver 18 is moved along line 14 toward the first transmitter 10 a distance equal to one-half the wavelength of the frequency emitted during a one-second interval, it may be said that the receiver 18 will detect an additional one-half wavelength of the signal transmitted by the transmitter 10 during that one second time interval and thus the apparent frequency will be increased by one-half Hertz. Through similar reasoning, the apparent frequency of the signal from the second transmitter 12 will be decreased one-half Hertz. If the two apparent frequencies are combined to produce a beat frequency, a one Hertz beat frequency will exist and this beat frequency may be counted to yield a result of one beat frequency cycle during the one second interval. Remembering that the distance moved during this period was one-half wavelength, it is seen that for each one-half wavelength of movement between the transmitters 10 and 12, one beat frequency cycle will be detected.

Yet another way of stating the same result is that as the receiver 18 moves with respect to the transmitters 10 and 12, the differences between the distance from the receiver 18 to the first transmitter 10 and the distance from the receiver 18 to the second transmitter 12 will change. When the absolute value of that difference in distances is equal to one wavelength of the frequency transmitted by the transmitters 10 and 12, one beat frequency cycle will be counted and the receiver will have moved a distance equal to one-half wavelength along the line 14. The sign of the difference between the distances will indicate the direction of the receiver 18 movement. Thus, if the original position of the receiver 18 is known along the line 14, beat frequency cycles may be counted and used to continuously compute the position of the receiver 18.

Although the transmitters 10 and 12 of the above example were assumed to have been at rest with respect to the propagation medium, it can be shown that this same relationship between receiver movement and beat frequency cycles will exist when the above system comprising the transmitters 10 and 12 and the receiver 18 is moving through the propagation medium. This result can be understood by assuming, for example, that the system of FIG. 1 is moving through the propagation medium in a direction indicated by the arrow 24. It will be observed from a consideration of the Doppler effect that the wave crests of the waves emitted by the first transmitter 10 between the first transmitter 10 and the receiver 18 will be farther apart than when the system is at rest. Conversely, the wave crests of the waves emitted by the second transmitter 12 between the second transmitter 12 and the receiver 18 will be closer together than when the system is at rest. As the receiver 18 moves a distance along the line 14, equal to one-half wavelength of the transmitted frequencies when this wavelength is measured with the systems at rest, the combined effect of the signals from the two transmitters 10 and 12 cancels out any difference in actual signal wavelength of the signals between the receiver 18 and the transmitters 10 and 12 and the receiver 18 detects one beat frequency cycle.

Returning to a consideration of the example of FIG. 1, the relationship between the receiver 18 movement between the transmitters 10 and 12 and beat frequency cycles may be expressed by the following well-known expression that is the theoretical basis for the present invention and other Doppler-derived systems:

$$d = d_o + \lambda \cdot n_o/2$$

where d is the position or distance from the origin, $d_o$ is the original or initial position, n is the number of beat frequency cycles counted, and $\lambda_o$ is the wavelength of the frequency transmitted from the transmitters 10 and 12.

Figure 2:
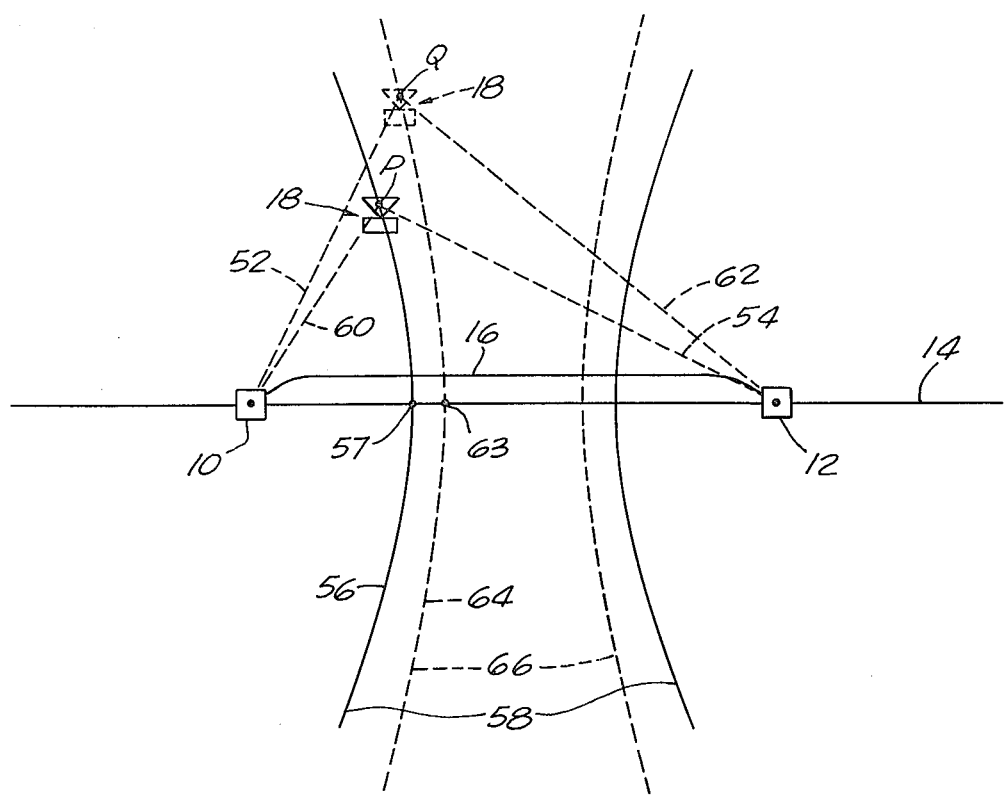
FIG. 2 is a second simplified diagram for further illustrating the principle of the present invention.

The above-described example may be broadened to include instances where the receiver 18 is not located on the line 14 that intersects the two transmitters 10 and 12. With reference now to FIG. 2, the receiver 18 may be positioned at some point P that is located a first distance 52 from the first transmitter 10 and a second distance 54 from the second transmitter 12. It is known from analytic geometry that a set of points may be selected such that the difference between the distances from each point in the set to the first transmitter 10 and to the second transmitter 12 will be equal to the difference between the first distance 52 and the second distance 54 and that this set of points will define one curve 56 of a hyperbola 58 that intersects the line 14 at a point 57. It will be apparent from the above discussion that as the receiver 18 moves from the point P along the curve 56, the difference between the distance from the receiver 18 to the first transmitter 10 and the distance from the receiver 18 to the second transmitter 12 will remain unchanged. Since this difference remains constant, no beat frequency cycles will be detected.

However, if the receiver 18 should stray from the curve 56, for example by moving to a new point Q of FIG. 2, it is well known that a second difference between a third distance 60 to the transmitter 10 and a fourth distance 62 to the transmitter 12 will vary accordingly from the first difference between the distances 52 and 54, and the receiver 18 will detect a beat frequency which may be counted. The direction of movement of the receiver 18 toward either the transmitter 10 or the transmitter 12 will be indicated by the phase of beat frequency cycles. Through well known mathematical and navigational techniques, the beat frequency cycles or portions thereof may be manipulated to establish a second curve point 63 on a curve 64 of a hyperbola 66 which intersects the point Q. In this manner, movement of the receiver 18 will produce beat frequency cycles that may be used to establish new curves along which the receiver is located.

As will be known to those skilled in the art, the example described above with respect to FIG. 1 and FIG. 2 is for exemplary purposes only are not to be construed as limitations upon the invention disclosed herein.

Figure 3:
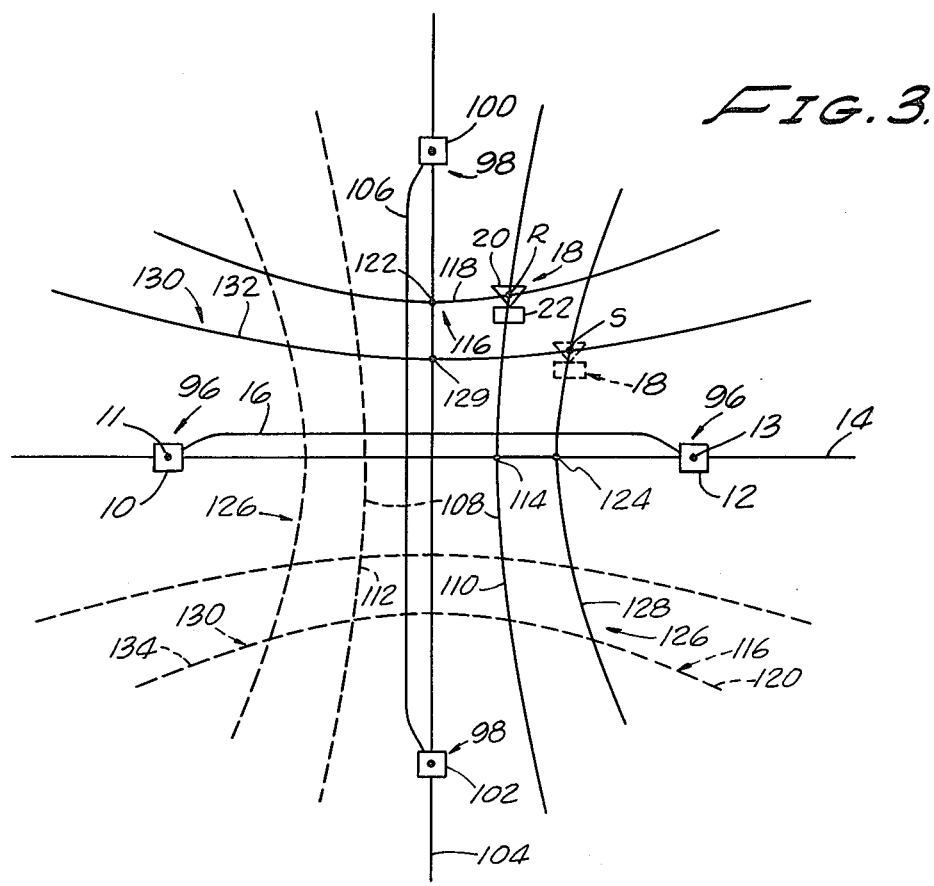
FIG. 3 is a plan view of an exemplary navigation system utilizing the present invention.

With respect now to FIG. 3, a navigation system according to a preferred embodiment of the present invention includes a first transmitter pair 96 comprising a first transmitter 10 and a second transmitter 12. Each transmitter 10 and 12 includes an antenna 11 and 13 respectively and the transmitters 10 and 12 are spaced a suitable distance along a line 14 that intersects each of the antennas 11 and 13. Although the line 14 may be oriented in any desired direction, the line 14 is preferably selected so as to be directed in a generally east-west direction thereby aiding in the navigational computations. The first and second transmitters 10 and 12 further include the necessary excitation and radio frequency amplification means so as to comprise a complete continuous wave radio frequency transmitting station as will be subsequently explained with reference to FIG. 4.

Connecting the first transmitter pair 96 is a first common frequency standard link 16 for supplying a common excitation signal to both transmitters 10 and 12. The common excitation signal could be generated by either the first transmitter 10 or by the second transmitter 12 or could be generated externally therefrom and supplied to both transmitters 10 and 12 by means of one or more similar links 16. The particular transmission means of the link 16 is not critical and may employ any suitable means for conducting the common excitation signal from one transmitter to another. The link 16 may, for example, be coaxial cable or a microwave system or may include a dielectric as with a fiber optic system. Although the link 16 is shown as running parallel to the line 14, it is to be understood that the direction and route of the link 16 is not critical to the operation of the present invention.

A second and similar transmitter pair 98 comprising a third transmitter 100 and fourth transmitter 102 is disposed along a line 104. In the exemplary navigation system of FIG. 3, the line 104 is generally perpendicular to the line 14 and is thus arranged in a substantially north-south direction. It is to be understood that the precise bearing of this particular line 104, as with the line 14, is not critical. However, the lines 14 and 104 should be preferably arranged to be generally perpendicular so as to form a suitable navigation grid or pattern as will be subsequently described.

A common frequency standard link 106 connects the third transmitter 100 and the fourth transmitter 102 and is provided to carry a second common signal between the second transmitter pair 98. As indicated above with respect to the link 16, the link 106 may also comprise any suitable transmission means. Also as described above, the common excitation signal may be generated by either transmitter 100 or 102 or may be generated externally.

With further reference to FIG. 3, a receiver 18 is deployed within the fields created by the first transmitter pair 96 and the second transmitter pair 98. The receiver 18 generally comprises an antenna and the appropriate signal processing means 22 for detecting and counting beat frequencies developed between the transmitters 10 and 12 and between the transmitters 100 and 102 and for computing the receiver position and related navigational information. A more detailed description of the receiver 18 will be made with respect to FIG. 5.

The frequencies of the signals radiated by the transmitters of a pair as, for example, the transmitters 10 and 12 of the first transmitter pair 96 or the transmitters 100 and 102 of the second transmitter 98, may be equal as was described with respect to FIGS. 1 and 2 above. However, as noted previously and in order to further enhance the accuracy of the preferred embodiment of FIG. 3, the transmitters of a transmitter pair may instead emit signals having distinct frequencies which are precisely related and both derived from the same common excitation signal source.

Figure 4:
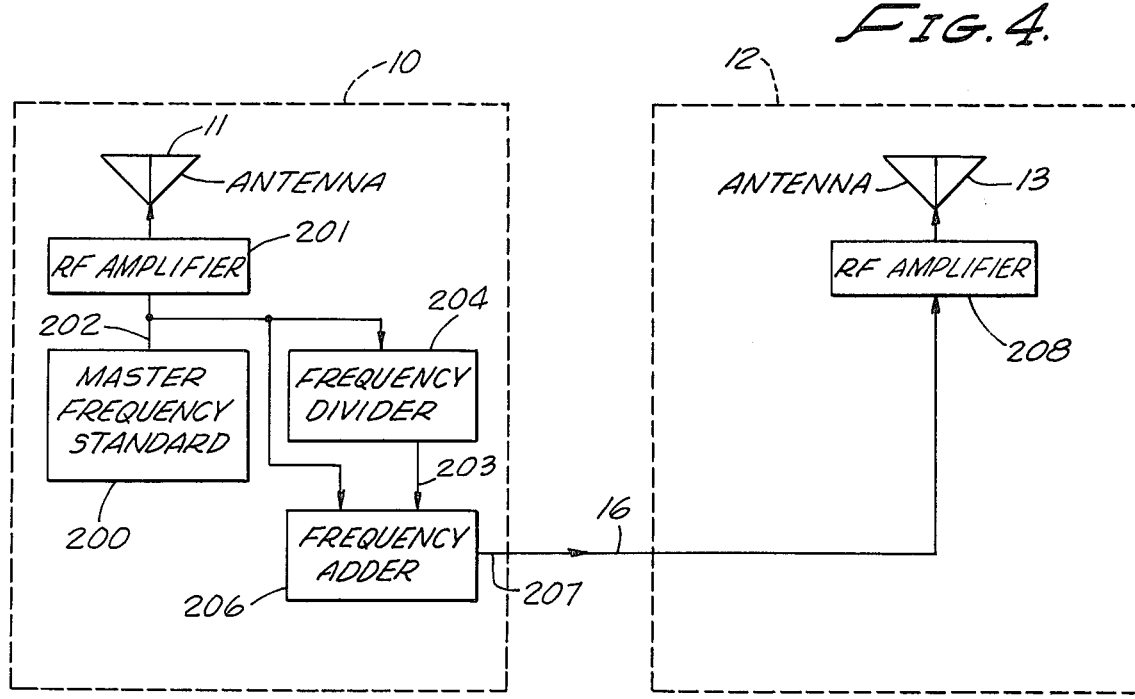
FIG. 4 is a block diagram of a typical transmitter pair.

This feature of a preferred embodiment of the present invention may be more fully understood and explained for the first transmitter pair 96 by referring to FIG. 4. The first transmitter 10 of the pair includes a master frequency standard 200 that provides a stable standard frequency signal 202 with a frequency $f_x$ through a radio frequency (rf) amplifier 201 for amplification and isolation to the antenna 11 which radiates a navigation signal having the frequency of the signal 202. The signal 202 from the master frequency standard 200 is also applied to a frequency divider 204 wherein the frequency f of the signal 202 is divided by a suitable numerical constant which will be identified as N. The numerical constant N may be, for example, an integer such as two or three, although it is to be understood that the numerical constant N need not be an integer but need only be some predetermined constant value. An output signal 203 from the frequency divider 204 is applied along with the signal 202 from the master frequency standard 200 to a frequency adder 206 where the signal 200 and the output signal 203 from the frequency divider 204 are added so as to provide a new signal 207 with a frequency $f_x + f_x/N$ which is the sum of the frequencies of the two signals 202 and 203. The signal with a frequency that is the difference between the frequencies of the signals 202 and 203 is suppressed.

This new signal 207 from the frequency adder 206 is conducted by the link 16 to the second transmitter 12 where it is applied through an rf amplifier 208 to the radiating antenna 13. The result of the combined operation of the first transmitter 10 and the second transmitter 12 is that signals with two different but precisely related frequencies are transmitted, thus maintaining the accuracy and stability of the navigation system of the present invention.

The frequency translation accomplished by the frequency divider 204 and the frequency adder 206 may, of course, be accomplished through other frequency synthesizer means which are well known in the art and which may provide for adjusting the numerical constant N according to the requirements of the navigation system or, for example, for security purposes. The remaining blocks of the transmitters 10 and 12 of FIG. 4 are similarly well known in the art and need not be further specified.

Similarly, the second transmitter pair 98 of FIG. 3 comprising the third transmitter 100 and the fourth transmitter 102 emit signals having different frequencies that are precisely related through circuitry similar to that described with respect to FIG. 4. The third transmitter 100 emits a signal with a frequency $f_y$ and the fourth transmitter 102 emits a signal with a frequency $f_y + f_y/M$. It will be realized that the subscript X for signals of the first transmitter pair 96 indicates that the signals are used to compute the location of the receiver 18 with respect to an axis generally parallel to an X axis of an X-Y coordinate system, or generally east-west, and the subscript Y for the second transmitter pair 98 signals indicates that those signals are used to compute the location of the receiver 18 with respect to an axis that is generally parallel to an Y axis of an X-Y coordinate system, or generally north-south. The divisor M used to produce the precisely related frequencies for the second transmitter pair 98 may be equal to the divisor N used to produce the similarly precisely related frequencies of the first transmitter pair 96, or the divisors may be different. The divisors may be selected to meet the frequency requirements of the particular navigation system by producing frequencies within a particular frequency range or band.

Figure 5:
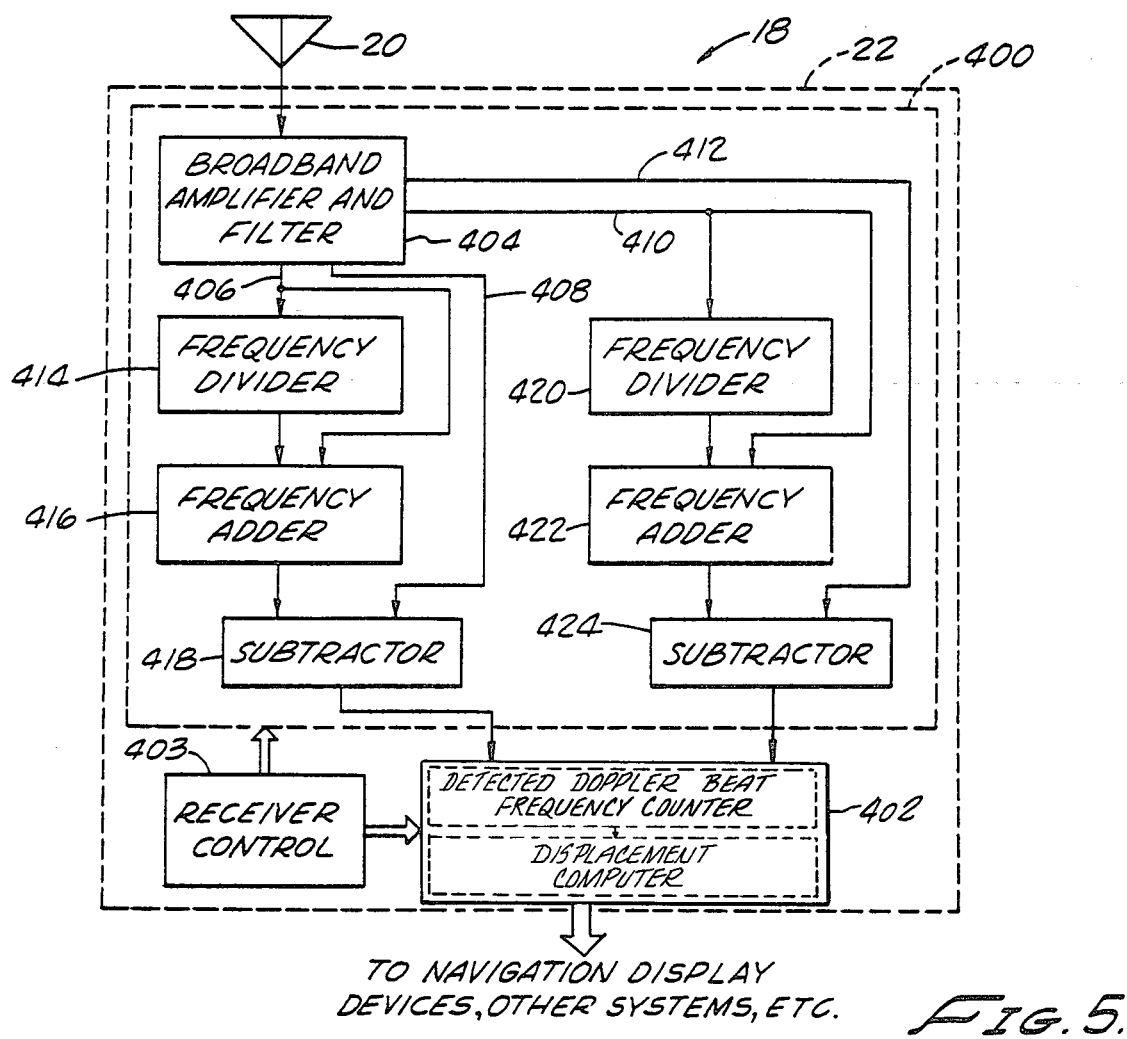
FIG. 5 is a block diagram of a complete receiver utilized in implementing the present invention.

The receiver 18 of the navigation system of the present invention comprises an antenna 20 and the signal processing means 22 (FIG. 5). The signal processing means 22 in turn includes rf signal processing circuitry 400, a navigational computer means 402 and a receiver control means 403. The rf signals from the antenna 20 are applied to a broadband amplifier and filter 404 wherein all four signals from the transmitters 10, 12, 100 and 102 (FIG. 3) are amplified and filtered to provide four output signals 406, 408, 410, and 412. The first output signal 406 (FIG. 5) is a signal with the apparent frequency of the signal transmitted by the first transmitter 10. It is to be appreciated that the frequency of the first output signal 406 is the apparent frequency of the first transmitter 10 since the frequency of the signal transmitted by the first transmitter 10 as detected by the receiver 18 will be shifted according to the Doppler effect when there is relative motion of the receiver 18 toward or away from the transmitter. As will be understood by those skilled in the art, this relative motion may be radially to or from the transmitter but in practical appplications will most likely be at some angle to a line drawn between the transmitter 10 and the receiver 18 (FIG. 3).

In a similar fashion, the second, third and fourth output signals 408, 410 and 412, have frequencies that are the apparent frequencies of the signals transmitted by the second, third and fourth transmitters 12, 100 and 102 respectively.

The first output signal 406 is processed by a frequency divider 414 and a frequency adder 416 to shift the frequency of the signal according to the same numerical constant divisor N as was described previously for the signal 207 that is applied to the second transmitter 12. The resulting signal from the frequency divider 414 (FIG. 5) is added to the first transmitter's apparent frequency in a frequency adder 416 and the resulting signal is applied to a subtractor 418. The second output signal 408 from the broadband amplifier and filter 404, the frequency of which is the apparent frequency of the signal from the second transmitter 12, is applied to the subtractor 418 which produces a signal that represents the difference in frequency between the frequency of the signal from the frequency adder 416 and the frequency of the second output signal 408. A second frequency divider 420 and frequency adder 422 similarly process the third output signal 410 using the numerical constant M. The output from the second frequency adder 422 and the fourth output signal 412 are applied a second subtractor 424 and the output signal therefrom represents the difference in frequency between the signal from the second frequency adder 422 and the fourth output signal 412.

It will be noted that, although the frequency of the signal generated by the frequency adder 416 may be different from the frequency of the signal 207 generated by the frequency adder 206 within the first transmitter 10 (FIG. 4), the ratio of the frequency of the signal 207 to the frequency of the signal 202 is equal to the ratio of the frequency of the output signal from the frequency adder 416 to the frequency of the first signal 406. A similar relationship exists between the ratio of the frequency $f_y + f_y/M$ to the frequency $f_y$ and the ratio of the frequency of the signal from the frequency adder 422 to the frequency of the third signal 410 (FIG. 5). As will be understood by one skilled in the art, the upward frequency shift of the first and third output signals 406 and 410 may instead be replaced by similar but opposite downward frequency shifts of the second and fourth output signals 408 and 412, assuming that the benefits associated with the upward frequency shift in the receiver 18 are not desired.

The output signals from the subtractors 418 and 424 may be of an analog or digital format. In order for the phase of the output signals to be detected, however, it is preferred that the signals be of an analog format, although digital signals may be used if, for example, the subtractors additionally generate zero-crossing signals that may be applied in turn to the navigational computer 402.

The output signals from the first subtractor 418 and the second subtractor 424 are then provided to the navigational computer 402. The navigational computer is preferably primarily a digital computer and processes these signals in a manner to be more fully explained in the operational description that follows so as to continually generate output signals required for navigation display devices or for other systems that require navigation data. The navigational computer may additionally include interface circuitry that is necessary to convert the primarily digital computational results into output signals that are used to drive the navigational display devices and other systems.

The receiver control means 403 includes, for example, a keyboard comprising the alphabetical, numerical and special function keys that are necessary to control the receiver 18 operation. The various control operations that may be performed at the receiver control 403 include entry of the initial coordinates of the receiver 18 and the transmitters 10, 12, 100 and 102, entry of the coordinates of waypoints that define a course of travel for the receiver 18, entry of the destination coordinates, and entry of the frequencies and numerical constants for the transmitters 10, 12, 100 and 102. The coordinate data is entered into and operated upon by the navigational computer 402 and the frequency data is applied both to the navigational computer 402 and to the broadband amplifier and filter 404 of the rf signal processing circuitry 400. The filter center frequencies of the broadband amplifier and filter 404 are set to correspond to the associated transmitter frequency. The numerical constants are applied to the frequency dividers 414 and 420.

An explanation and example of the operation a preferred embodiment of the present invention will now be presented. Turning to FIG. 3, the first transmitter pair 96 emits signals that have precisely related frequencies in accordance with the description related to FIG. 4 above. Similarly, signals with precisely related frequencies are transmitted by the second transmitter pair 98. The signals from the two transmitter pairs 96 and 98 thus establish a field of radiation within which the receiver 18 is deployed and through which it moves.

The receiver 18 is initially disposed at a point R (FIG. 3) that is generally within the radiation field created by the two transmitter pairs 96 and 98. Before the receiver is able to perform its navigational function, however, certain initial data must be provided to the receiver 18. For the preferred embodiment described above, this data includes corrdinates for the initial location of the receiver 18 at the point R, the transmitter frequencies, coordinates and numerical constants of the four transmitters 10, 12, 100 and 102, and other desired data such as course waypoints, destination coordinates and the like. This data is entered into the receiver 18 through the control means 403 and is variously applied to the rf signal processing means 22 and the navigational computer 402 as was described with reference to FIG. 5. As may be appreciated, portions of this initial data such as the transmitter locations, frequencies, and numerical constants, may be stored in a suitable memory means within the receiver 18, and may be used to initialize the receiver 18 by entering a particular transmitter pair identification through the receiver control 403.

Once the initial data has been entered into the receiver 18, the navigational computer 402 (FIG. 5), through use of conventional equations determines from the coordinates of the receiver 18 and the transmitters 10 and 12 the equation for a first hyperbola 108 (FIG. 3) that comprises a first curve 110 nearest the transmitter 12 and a second curve 112 nearest the transmitter 10. The first hyperbola 108 has for its foci the first transmitter pair 96 and is determined such that the receiver 18 at the point R lies on the first curve 110. As part of this computational process, a first intersection point 114 is determined at the intersection of the first curve 110 and the line 14. In a similar manner, the navigational computer 402 (FIG. 5) determines the equation for a second hyperbola 116 (FIG. 3) with foci at the second transmitter pair 98 and having a first curve 118 nearest the transmitter 100 and a second curve 120 nearest the transmitter 102. The second hyperbola 116 is determined such that the receiver 18 is located on the first curve 118 and the first curve 118 intersects the line 104 at a second intersection point 122.

Assume now that the receiver 18 is moved from the first point R to some second point S that is within the field of radiation created by the transmitter pairs 96 and 98 and that the point S does not lie on the curve 110 or the curve 118. As described for the examples of FIGS. 1 and 2, the difference between the distances from the receiver 18 to the first transmitter 10 and the second transmitter 12 will change as the receiver 18 moves from the point R to the point S and thus a number of beat frequency cycles proportional to this changed difference in distances is produced at the output of the first subtractor 418 (FIG. 5). The direction of the movement of the receiver 18 toward the second transmitter 12 will be indicated by the phase of the beat frequency cycles which may be detected within the navigational computer 402 by means of a tertiary gate which may be set, for example, thirty degrees apart which would operate in a first sequence for movement of the receiver 18 in a first direction, and would then operate in a second and opposite sequence for movement of the receiver 18 in a second direction. Through mathematical techniques that are known in the art, these beat frequency cycles and the wavelength of the signal transmitted by the second transmitter 12 (FIG. 3) are manipulated by the navigational computer 402 to calculate the position of a third intersection point 124 (FIG. 3) along the line 14. Once this third intersection point 124 is determined, the navigational computer 402 (FIG. 5) determines the equation for a new hyperbola 126 having a first curve 128 and a second curve 130.

Similar computations are performed for the second transmitter pair 98 when the receiver 18 is moved from the first point R to the second point S. Beat frequency cycles are produced at the output of the second subtractor 424 (FIG. 5) and the number of these cycles is proportional to the change in the difference between the distances from the receiver 18 to the third and fourth transmitters 100 and 102 when the receiver 18 is at the first point R and then the second point S. These beat frequency cycles will of course be produced by the subtractor 424 (FIG. 5) gradually as the receiver 18 moves from the first point R to the second point S. The number of beat frequency cycles detected along with the wavelength of the signal transmitted by the fourth transmitter 102 are used to determine the position of a fourth intersection 129 along the line 104 and in turn the equation for a fourth hyperbola 130 comprising a first curve 132 and a second curve 134 is determined.

Once the equations for the third and fourth hyperbolas 126 and 130 are determined, the navigational computer 402 then selects the curves that intersect the points 124 and 129 and solves for the intersection of those curves. Here, the navigational computer 402 selects the curves 128 and 132 and solves for the intersection point S. The navigational computer 402 then translates this new position into the various signals that are required to drive the navigational display devices and the other systems.

Thus, by way of a brief summary and with reference to FIGS. 3 and 5, the navigational computer 402 performs a series of calculations based on equations that are well known to those skilled in the art to determine the movement of the receiver 18 with respect to the first and second transmitter pairs 96 and 98. Once the initial coordinates of the receiver 18 and the transmitters 10, 12, 100 and 102 are applied to the navigational computer 402 from the control means 403, the navigational computer determines the equations for the first and second hyperbolas 108 and 116. The hyperbolas 108 and 116 are determined such that the receiver 18 is located on the first curves 110 and 118 of the respective hyperbolas. As part of this initial computation, the first and second intersection points 114 and 122 are determined at the intersections of the first and second curves 110 and 118 and the lines 14 and 104, respectively. When the receiver 18 is moved from the first point R to the second point S, the corresponding beat frequencies from the first and second subtractors 418 and 424 and the wave lengths of the signals transmitted by the second and fourth transmitters 12 and 102 are manipulated by the navigational computer 402 to determine the position of a third intersection point 124 and a fourth intersection point 129 along the lines 14 and 104, respectively. Once the intersections points 124 and 129 are determined, the navigational computer 402 generates the equations for two new hyperbolas 126 and 130.

Finally, the navigational computer 402 selects the curves 128 and 132 which intersect the lines 14 and 104 at the third and fourth intersection points 124 and 129 and solves for the intersection of those curves, thereby determining the coordinates of point S. The navigational computer 402 may then translate these coordinates into the signals that may be required to drive the various display devices and other systems.

In this fashion, as the receiver 18 moves within the field created by the first and second transmitter pairs 96 and 98, the position of the receiver 18 is periodically updated to provide navigational information. Although this example is described as though one set of computations are performed first for the first point R and then a second set of computations are performed once the receiver 18 reaches the point S, the computational process may for example be performed at any convenient time interval or may be performed at the time of the receipt of one complete beat frequency cycle.

The parameters of a navigation system utilizing the present invention will be chosen so as to provide the system resolution and coverage desired for the particular application. These parameters include but are not necessarily limited to the frequency of each transmitter, the distance between transmitters, the orientation of the transmitter pairs, and the range of the receiver 18 (FIG. 3) velocity with respect to the transmitter pairs.

Although the embodiment described with reference to FIG. 3 is for a two dimensional system, the present invention includes three-dimensional applications within its scope. In three dimensions, the first hyperbola 108 and the second hyperbola 116 are rotated about the lines 14 and 104 respectively to form four surfaces. The surfaces defined by the curves 110 and 118 intersect in a curve along which the receiver 18 may travel in three dimensions without, theoretically, generating any beat frequency cycles upon which the navigational computer 402 of FIG. 5 can operate. This presents an undefined path for the receiver 18. This undefined path may be eliminated, however, by an embodiment of the present invention wherein the signal frequencies for the four transmitters 10, 12, 100 and 102 are derived from a single master frequency source in the manner described above. Since all four transmitters 10, 12, 100 and 102 would then transmit precisely related signals, the receiver 18 can simultaneously compute its position with respect to six pairs of transmiters (the maximum pair combinations available with four transmitters) and this simultaneous position information is then used to resolve any undefined path taken by the receiver 18.

Figure 6:
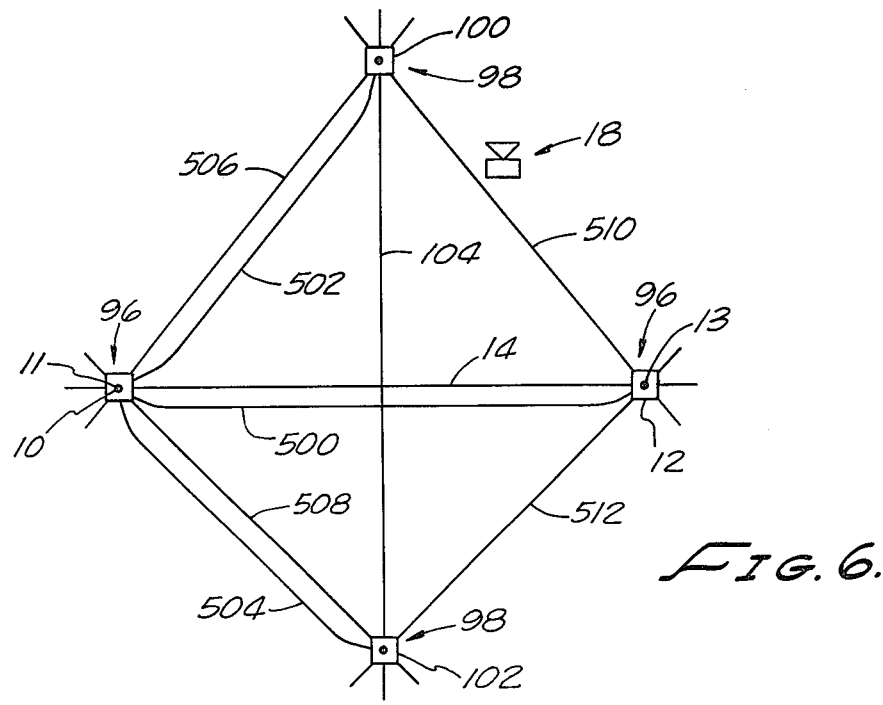
FIG. 6 is a plan view of an alternative embodiment of the present invention.

With reference to FIG. 6, four transmitters 10, 12, 100 and 102 are arranged in two pairs 96 and 98 along two lines 14 and 104 as described with respect to FIG. 3. Unlike FIG. 3, however, the embodiment of FIG. 6 includes three frequency links 500, 502 and 504 that join the first transmitter 10 with the second, third and fourth transmitters 12, 100, 102 respectively.

Figure 7:
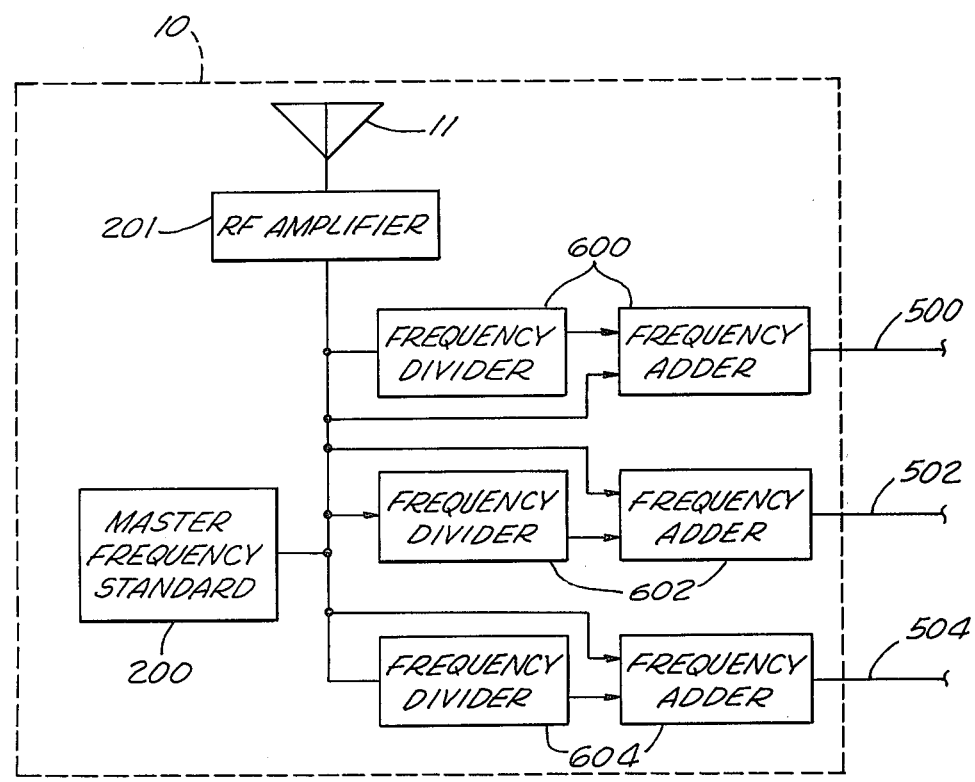
FIG. 7 is a block diagram at a first transmitter according to the alternative embodiment.

The first transmitter 10 (FIG. 7) includes three sets of frequency dividers and frequency adders 600, 602, 604 similar to the frequency divider 204 and the frequency adder 206 of FIG. 4. The first frequency divider and frequency adder set 600 generates a signal with a frequency that is precisely related to the frequency of the master frequency standard 200 and this signal is applied to the second transmitter 12 (FIG. 6) by means of the link 500 (FIGS. 6 and 7). The second and third frequency divider and frequency adder sets 602 and 604 similarly generate signals that are transmitted to the third and fourth transmitters 100 and 102 by means of the links 502 and 504. The second, third and fourth transmitters 12, 100 and 102 are identical in implementation to the second transmitter 12 of FIG. 4. Although the signals generated by each frequency divider and frequency adder set 600, 602, and 604 are precisely related to the frequency of the master frequency standard 200, the numerical constants used within each of the sets 600, 602, and 604 are different so that the frequencies of the signals transmitted by the second, third and fourth transmitters 12, 100 and 102 are all distant yet are all exactly related to one another.

Figure 8:
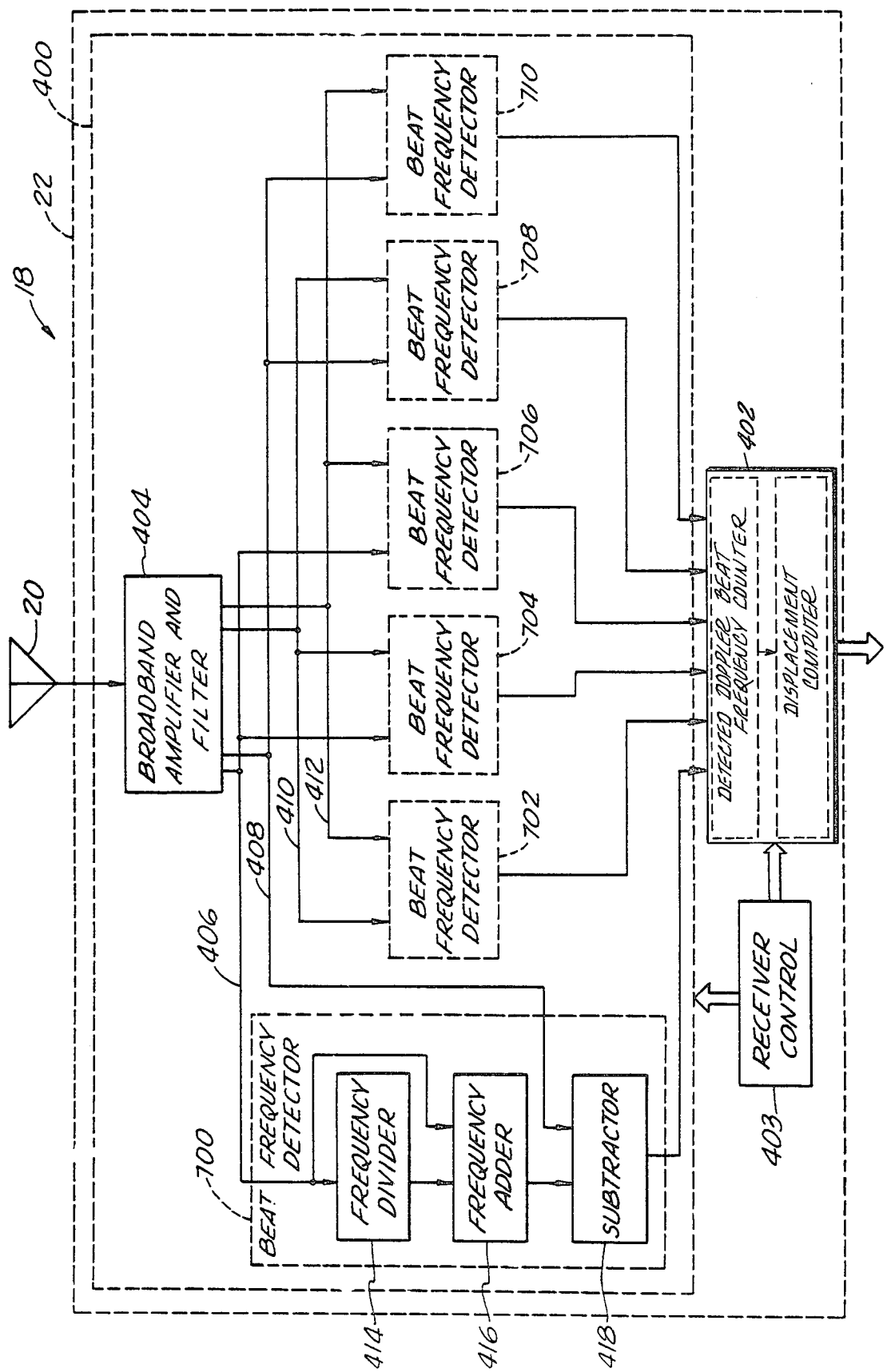
FIG. 8 is a block diagram of a receiver used in the alternative embodiment of the invention.

A receiver 18 (FIG. 6) is deployed within the fields created by the two transmitter pairs 96 and 98. The receiver 18 (FIG. 8) includes the antenna 20 and the signal processing means 22. The signal processing means 22 comprises rf signal processing circuitry 400, a navigational computer 402, and a receiver control means 403. The rf signal processing circuitry 400 includes a broadband amplifier and filter 404 that produces four signals 406, 408, 410 and 412 as described with respect to FIG. 5 that are signals having the apparent frequencies of the four transmitters 10, 12, 100 and 102. The rf signal processing circuitry 400 additionally includes six beat frequency detectors 700, 702, 704, 706, 708 and 710 each of which includes a frequency divider 414, a frequency adder 416, and a subtractor 418 as described for FIG. 5. The first beat frequency detector 700 compares the first and second signals 406 and 408 from the broadband amplifier and filter 404. In a like manner, the second through sixth beat frequency detectors 702, 704, 706, 708 and 710 compare the third and fourth signals 410, 412, the first and third signals 406, 410, the first and fourth signals 406, 412, the second and third signals 408, 410, and the second and fourth signals 408, 412. The numerical constant selected for use in the frequency divider 414 is such that the frequency divider 414 and the frequency adder 416 exactly compensate for the precise frequency shift introduced by the first frequency divider and frequency adder pair 600 (FIG. 7) between the associated transmitter pairs. Similarly selected numerical constants are employed by the remaining beat frequency detectors 702, 704, 706, 708 and 710 to compensate for the precise frequency differences between the associated transmitters. Thus, the outputs of the beat frequency detectors 700, 702, 704, 706, 708, 710 are signals that represent beat frequency cycles proportional to the change in the difference in distances from the receiver 18 to the transmitters of a pair, as has been described above with respect to FIG. 2.

Thus, the receiver 18 operates in fields created by six transmitter pairs, the first pair comprising the first and second transmitters 10, 12 (FIG. 6) along the first line 14. The remaining transmitter pairs and associated lines are as follows: a second transmitter pair comprising the third and fourth transmitters 100 and 102 along the second line 104; a third transmitter pair comprising the first and third transmitters 10 and 100 along a third line 506; a fourth transmitter pair comprising the first and fourth transmitters 10 and 102 along a fourth line 508; a fifth transmitter pair comprising the second and third transmitters 12 and 100 along a fifth line 510; and a sixth transmitter pair comprising the second and fourth transmitters 12 and 102 along a sixth line 512.

In operation, this embodiment of the present invention functions similarly to the description above for the embodiment of FIG. 3. Howver, the navigational computer 402 (FIG. 8) solves equations for six pairs of transmitters and selects the required pairs to resolve the location of the receiver along the undefined curve described above. As will be appreciated, if the receiver 18 is moving along an undefined path for two pairs of transmitters, the navigational computer 402 will select another transmitter pair and solve for the hyperbolic surface associated with that pair that will intersect the receiver 18 in three dimensional space. Although the embodiment has been described with respect to six pairs of transmitters, one skilled in the art will recognize that if a slight decrease in the accuracy of the system is acceptable, as few as four pairs may be used yet still provide sufficient information to locate the receiver 18 with respect to three dimensions.

Figure 9:
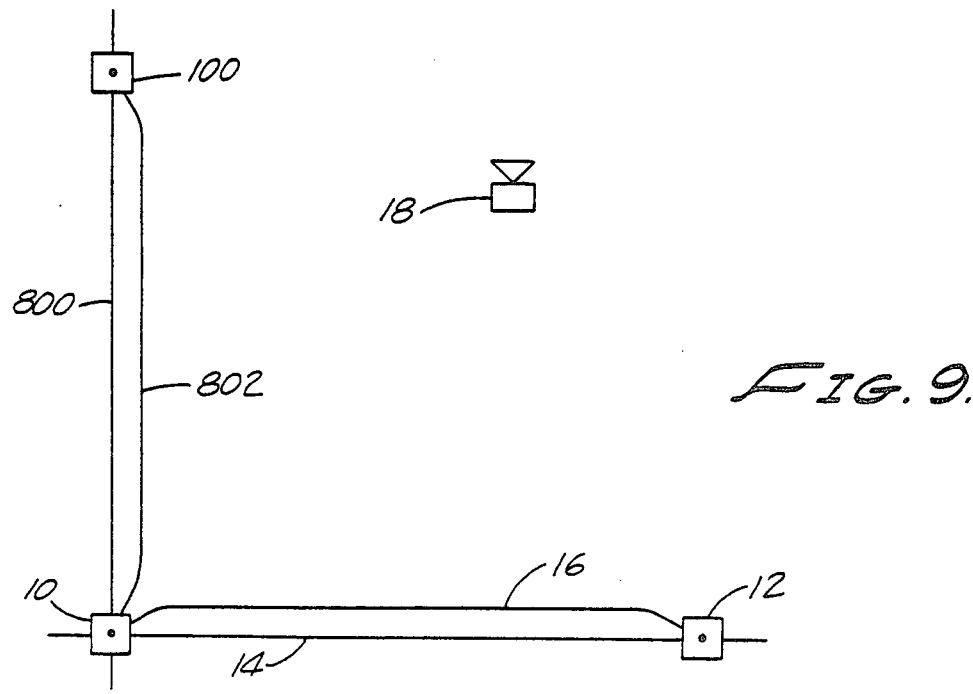
FIG. 9 is a block diagram of yet a third alternative embodiment of a navigation system implemented using the present invention.

Using the single excitation frequency source embodiment described above for FIG. 6, it is possible to construct a two-dimensional system as in FIG. 3 with as few as three transmitters. The three transmitters 10, 12 and 100 (FIG. 9) are arranged so as to define at least two generally perpendicular lines 14 and 800 which both pass through the first transmitter 10. The first transmitter 10 is connected to the second transmitter 12 by the link 16 and is also connected to the third transmitter 100 by means of a similar link 802. The transmitter 10 includes two frequency divider and frequency adder sets similar to the sets 600 and 602 of FIG. 7. The receiver 18 positioned within the fields created by the transmitters 10, 12 and 100, process the signals as described with reference to FIG. 3 for a first pair comprising the first and second transmitters 10 and 12 and a second pair comprising the transmitters 10 and 100. In this way, a complete two-dimensional navigation system similar to FIG. 3 is created but with three transmitters instead of the four transmitters illustrated therein.

It should be noted that the navigation system of the present invention, although described herein with respect to radio frequency electromagnetic waves, may be implemented in any medium wherein the Doppler effect applies as, for example, in a navigation system according to the present invention that transmits sound from fixed transmitters through water to a moving receiver deployed in the water. Such a system could be used, for example, to position petroleum drilling vessels or to precisely locate underwater wellheads or other mineral deposits.

Having thus described my invention in detail, it is to be understood that numerous equivalents and alternatives that do not depart from the invention will be apparent to those skilled in the art, given the teachings herein. Thus, my invention is not to be limited to the above description but is to be of the full scope of the appended claims.

I claim:

1. A navigation system, comprising,
    frequency standard means for generating at least one frequency standard signal,
    transmitter means comprising at least three transmitters arranged in pairs, each of said transmitters fixed in location relative to the others and transmitting a navigation signal,
    link means for supplying at least one frequency standard signal to each transmitter of said transmitter means for providing each transmitter with an excitation signal, each transmitter being responsive to the applied excitation signal for establishing the frequency of the navigational signal transmitted therefrom, and
    receiver means responsive to the navigation signals for detecting and counting Doppler frequency shifts in said navigation signals separately from pairs of the transmitter means and for determining receiver means displacement with respect to a known starting position and with respect to said pairs of transmitter means in accordance with detected and counted Doppler frequency shifts.

2. A navigation system as in claim 1 wherein said link means includes frequency shift means for establishing different precisely related frequencies of the navigation signals transmitted by the transmitters of a pair and the receiver means comprises
    means responsive to the navigation signals for providing corresponding received signals having frequencies proportional to the respective navigational signals such that the frequencies of the received signals from a pair of transmitters are equal when the receiver means is at rest with respect to said pair, detecting means and counting means responsive to the received signals for detecting and counting a Doppler beat frequency signal separately for each pair equal to the difference in frequency between the received signals from each pair, and means responsive to said detecting means and counting means for detecting receiver means displacement with respect to a known starting position and with respect to said pairs of transmitters according to the number of detected and counted cycles of said Doppler beat frequency signals.

3. The navigation system of claim 2 wherein the different precisely related frequencies are fixed.

4. A navigation system comprising, first frequency standard generating means for generating a first predetermined signal, second frequency standard generating means for generating a second predetermined signal, a first plurality of transmitter means for emitting navigation signals, a second plurality of transmitter means for emitting navigation signals, the first plurality of transmitter means and the second plurality of transmitter means being fixed in location with respect to one another, link means supplying the first signal to the first plurality of transmitter means and supplying the second signal to the second plurality of transmitter means for providing each transmitter means with an excitation signal, each transmitter means being responsive to the applied excitation signal for determining the frequency of the navigation signal emitted by the respective transmitter means, frequency shift means for shifting the frequency of at least one excitation signal of a pair of predetermined amount, and receiver means including means responsive to the navigation signals for generating corresponding received signals having frequencies proportional to the respective navigation signals, means responsive to the received signals for generating respective resulting signals and for shifting the frequency of at least one of the resulting signals from a pair of transmitter means of the first plurality of transmitter means such that the frequencies of the resulting signals from said pair are equal when the receiver means is at rest with respect to said pair and for shifting the frequency of at least one of the resulting signals from a pair of transmitter means of the second plurality of transmitter means such that the resulting signals from said last named pair are equal when the receiver means is at rest with respect to said last named pair, detecting means responsive to the resulting signals and counting means for counting Doppler beat frequency signals for each of the pairs of transmitter means, the frequency of each Doppler beat frequency signal being equal to the difference in frequencies between the resulting signals from the respective pair of transmitter means, and means responsive to the detecting means to determine receiver means position with respect to a known starting position and with respect to the first and second plurality of transmitter means according to the number of Doppler beat frequency signal cycles detected and counted.

5. The navigation system of claim 4 wherein the two pairs of transmitters define at least two axes which are substantially perpendicular.

6. A navigation system, comprising, frequency standard generating means for generating a first predetermined signal, a plurality of transmitter means for emitting navigation signals, fixed in location with respect to one another, the plurality of transmitter means being grouped into pairs, link means supplying the first predetermined signal to each transmitter means for providing each of the transmitter means with an excitation signal, each transmitter means being responsive to the applied excitation signal for determining the frequency of the navigation signal emitted by the transmitter means, frequency shift means for shifting the frequency of the excitation signal to at least one transmitter means of a pair a first predetermined amount, and receiver means including means responsive to the navigation signals for generating corresponding received signals having frequencies proportional to the respective navigation signals, means responsive to the received signals for generating respective resulting signals and for shifting the frequency of at least one resulting signal from each pair of transmitters such that the frequencies of the resulting signals from transmitter means of a pair are equal when the receiver means is at rest with respect to said transmitter means pair, detecting means responsive to the resulting signals and counting means for counting a Doppler beat frequency signal for each transmitter means pair, the frequency of the Doppler beat frequency signal being equal to the difference in frequencies between the respective resulting signals from a transmitter means pair, and means responsive to the detecting means and counting means to determine receiver means displacement with respect to a known starting position and in accordance with the number of beat frequency cycles detected and counted.

7. The navigation system of either claim 1, 2, 3, 4 or 6 wherein the link means include dielectric transmission means.

8. The navigation system of claim 7 wherein the dielectric transmission means includes a fiber optic guide member.

9. The navigation system of claim 7 wherein the dielectric transmission means includes a radio frequency microwave path.

10. The navigation system of claim 4 or claim 6 wherein the first predetermined amount for the frequency shift means that is connected to the same frequency standard generating means is unique.

11. The navigation system of claim 6 wherein at least one frequency standard generating means is included in a first transmitter means.

12. The navigation system of claims 4 or 6 wherein the frequency shift means is included in a first transmitter means.

13. The navigation system of claims 4 or 6 wherein the frequency shift of the at least one resulting signal from a pair of transmitter means is proportional to a ratio determined by the frequencies of the navigation signals transmitted by said pair of transmitter means.

14. A navigation system as claimed in anyone of claims 1, 4 or 6 for determining the position of the receiver means.

15. A receiver adapted to cooperate with a plurality of transmitters fixed with respect to one another and each emitting a navigation signal of predetermined frequency, the receiver including means responsive to the navigation signals for providing corresponding received signals having frequencies related to the respective navigation signal such that the frequencies of the received signals from first selected ones of the transmitters are equal when the receiver means is at rest with respect to the first selected ones of the transmitters and the frequencies of the received signals from second selected ones of the transmitters are equal when the receiver is at rest with respect to the second selected ones of the transmitters, first detecting means and counting means responsive to the received signals from the first selected ones of the transmitters for detecting a Doppler beat frequency signal equal to the difference in frequency between the received signals from the first selected ones of the transmitters, second detecting means and counting means responsive to the received signals from the second selected ones of the transmitters for detecting a Doppler beat frequency signal equal to the difference in frequency between the received signals from the second selected ones of the transmitters, and means responsive to the first and second detecting means for determining receiver displacement with respect to a known starting position and with respect to the plurality of transmitters according to the number of detected and counted cycles of the Doppler beat frequencies signals.

16. A method of navigation comprising the steps of, generating at least one frequency standard signal having a predetermined frequency, applying the frequency standard signal to a plurality of fixed, paired transmitter means to provide each transmitter means with an excitation signal, emitting a plurality of navigation signals from the plurality of paired transmitter means with paired transmitter means being responsive to excitation signals related to the same frequency standard signal, the frequencies of the navigation signals being determined by the respective excitation signals, detecting and counting one or more Doppler frequency shifts in said navigation signals, and determining receiver means displacement with respect to a known starting position and with respect to said plurality of transmitter means according to the detected and counted Doppler frequency shifts.

17. The method for navigation of claim 16 wherein the step of applying the frequency standard signal to a plurality of transmitter means includes the additional step of shifting the frequency of at least one excitation signal from the frequency of the associated frequency standard signal a predetermined amount, the step of detecting Doppler frequency shifts includes the steps of, generating received signals corresponding to the navigation signals having frequencies related to the respective navigation signals such that the frequencies of the received signals from transmitter means of a pair are equal when the receiver means is at rest with respect to the pair, detecting Doppler beat frequency signals having frequencies equal to the difference in frequency between received signals from a pair, and the step of determining receiver means displacement includes determining displacement with respect to the plurality of transmitter means according to the number of cycles of said Doppler beat frequency signals.

18. A method for navigation comprising the steps of, generating a first frequency standard signal, applying the first frequency standard signal to a first plurality of fixed transmitter means to provide each transmitter means thereof with an excitation signal, emitting a first plurality of navigation signals from said first plurality of fixed transmitter means, the frequencies of the first plurality of signals being related to the respective excitation signals, generating a second frequency standard signal, applying the second frequency standard signal to a second plurality of fixed transmitter means to provide each transmitter means thereof with an excitation signal, emitting a second plurality of navigation signals from said second plurality of fixed transmitter means, the frequencies of the second plurality of signals being related to the respective excitation signals, receiving the first and second plurality of navigation signals in a receiver, detecting and counting Doppler frequency shifts in at least two navigation signals of the first plurality of the navigation signals, and determining the displacement of the receiver with respect to a known starting position and with respect to the first and second plurality of transmitter means according to the detected and counted Doppler frequency shifts.

19. The method for navigation of claim 18 wherein the step of applying the first frequency standard signal to a first plurality of fixed transmitter means includes the additional step of shifting the frequency of at least one excitation signal from the frequency of the associated frequency standard signal a predetermined amount.

20. The method of claim 19 wherein the step of detecting Doppler frequency shifts in at least two navigation signals of the first plurality of navigation signals includes generating first received signals corresponding to the at least two navigation signals of the first plurality of navigation signals such that the frequencies of the first received signals are equal when the receiver is at rest with respect to the first plurality of fixed transmitter means, and detecting a Doppler beat frequency signal having a frequency equal to the difference in frequency between the first received signals, the step of detecting Doppler frequency shifts in at least two navigation signals of the second plurality of navigation signals includes generating second received signals corresponding to the at least two navigation signals of the second plurality of navigation signals such that the frequencies of the second received signals are equal when the receiver is at rest with respect to the second plurality of fixed transmitter means, and detecting a Doppler beat frequency signal having a frequency equal to the difference in frequency between the second received signals, and the determining step includes determining displacement with respect to the first and second plurality of fixed transmitter means according to the number of cycles of said Doppler beat frequency signals.

21. A method of navigation as claimed in either claim 18 or 19 including determining the position of the receiver.

22. The method of claim 18 wherein the step of applying the first frequency standard signal includes the additional step of applying the first frequency standard signal through dielectric transmission means.

23. The method of claim 18 wherein the step of applying the second frequency standard signal includes the additional step of applying the second frequency standard signal through dielectric transmission means.

24. A method for navigation comprising the steps of, generating at least one frequency standard,
applying at least one frequency standard signal to a plurality of transmitter means grouped into pairs to provide each transmitter means with an excitation signal, the step including shifting the frequency of at least one excitation signal of a pair from the frequency of at least one frequency standard signal a predetermined amount, each transmitter means of a pair being responsive to excitation signals derived from the same frequency standard signal,
emitting a plurality of navigation signals from the plurality of transmitter means which have a frequency that is determined by the frequency of the respective excitation signals,
receiving the navigation signals in a receiver,
generating received signals corresponding to respective navigation signals having frequencies proportional to the respective navigation signals,
generating resulting signals corresponding to respective received signals and shifting the frequency of at least one of the resulting signals from each pair of transmitter means such that the frequencies of the resulting signals from transmitter means of a pair are equal when the receiver is at rest with respect to said transmitter means pair,
detecting and counting a Doppler beat frequency signal for each transmitter means pair, the frequency of the Doppler beat frequency signal being equal to the difference in frequencies between the respective resulting signals from a transmitter pair, and
determining receiver position with respect to a known starting position and with respect to the plurality of transmitter means in accordance with the number of Doppler beat frequency cycles detected and counted.

25. The method of claim 24 wherein the step of shifting the frequency of at least one of the resulting signals includes shifting the frequency in proportion to a ratio determined by the frequencies of the navigation signals transmitted by the respective pair of transmitter means.

26. The method of claims 16 or 24 wherein the step of applying the at least one frequency standard signal includes the additional step of applying the at least one frequency standard signal through dielectric transmission means.

27. A method for processing signals from a plurality of transmitters and adapted to be used for navigation wherein the transmitters are grouped into pairs and the frequency of navigation signals emitted by the pairs are related to a common frequency standard source, comprising the steps of
generating received signals in a receiver corresponding to the navigation signals having frequencies related to the respective navigation signals such that the frequencies of the received signals from transmitters of a pair are equal when the receiver means is at rest with respect to the pair,
detecting and counting Doppler beat frequency signals having frequencies equal to the difference in frequency between received signals from a pair, and
determining displacement of the receiver with respect to a known starting position and with respect to the plurality of transmitter means according to the number of detected and counted cycles of said Doppler beat frequency signals.

28. A signal emission apparatus adapted to cooperate with receiver means to form a navigation system said receiver means being responsive to navigation signals for detecting and counting one or more Doppler frequency shifts in said navigation signals separately from pairs of transmitter means and for determining receiver means displacement with respect to a known starting position and with respect to said pairs of transmitter means in accordance with the detected and counted Doppler frequency shifts, the signal emission apparatus comprising frequency standard means for generating at least one frequency standard signal, at least three transmitter means arranged in two pairs, each of said transmitters fixed in location relative to the others and transmitting said navigation signal, and link means for supplying said at least one frequency standard signal to each transmitter for providing each transmitter with an excitation signal, each transmitter being responsive to the applied excitation signal for establishing the frequency of the navigation signal transmitted therefrom.

* * * * *